Aug. 4, 1959  AKITOSHI KITANO  2,897,765
DRIVING APPARATUS COMPRISING MODIFIED ELLIPTIC GEAR WHEELS
Filed Dec. 6, 1955  2 Sheets-Sheet 1

INVENTOR.
AKITOSHI KITANO
BY Ostrolenk, Faber,
Gerb & Soffen
ATTORNEYS

United States Patent Office 2,897,765
Patented Aug. 4, 1959

2,897,765

DRIVING APPARATUS COMPRISING MODIFIED ELLIPTIC GEAR WHEELS

Akitoshi Kitano, Sakyo-ku, Kyoto, Japan

Application December 6, 1955, Serial No. 551,450

Claims priority, application Japan December 7, 1954

4 Claims. (Cl. 103—126)

This invention relates to improvements in a driving apparatus comprising modified elliptic gear wheels and has for its object to provide a modified elliptic gear wheel driving apparatus wherein the change in a gearing pressure-angle of the gear wheels caused by the rotation thereof is reduced so as to relieve as a whole an actual gearing pressure between the gear wheels, and said gear wheels are not only kept at a good gearing state by preventing them from putting out of gear, but also are increased the thickness of a tooth by applying to the tooth an interference preventing method so as to increase the strength of the tooth and also to reduce the number of the teeth for facilitating the working thereof.

In the old elliptic gear wheels, an actual gearing pressure-angle at the gearing surface is changed depending on the rotation of the gear wheels, and as the shapes of the pitch lines of the gear wheels are made flatter, more larger changes in the gearing pressure-angles are obtained, and consequently the gear surfaces are liable for the wears which are in danger of putting the gearing out of gear. Also, as a radius of curvature along a long axial part of the ellipse forming the gear wheel is increased necessarily so as to decrease the size of the tooth, the number of the tooth is increased accordingly so that it has a defect to weaken the strength of the tooth.

Whereas, according to this invention, in order to remove all the defects in the old elliptic gear wheels, special modified elliptic gear wheels are used.

This invention consists of a driving apparatus comprising modified elliptic gear wheels characterized by that at the polar coordinates, it is assumed that $x$ indicates an independent variable mentioned in radian, the value of $n$ indicates 2, 3 and 4, $a$, $b$ and $c$ indicate the number regarding the length, $d$ indicates a positive number from zero to 1, and $\mu$ indicates the number determined by $a$, $b$, $c$ and $d$, then the length of a vector $\rho_1$ of a first curved line is obtained by the following formula $$\rho_1 = a + \cos nx\left(\frac{c.d^2|\sin nx|}{(1-d^2\cos^2 nx)^2} - b\right) \quad (I)$$

also, the directional angle $\theta_1$ of the vector $\rho_1$ is obtained by the following formula $$\theta_1 = \frac{1}{\mu}\int\frac{dx}{\rho_1} \quad (II)$$

nextly, the length of a vector $\rho_2$ of a second curved line is obtained by the following formula, $$\rho_2 = a - \cos nx\left(\frac{c.d^2|\sin nx|}{(1-d^2\cos^2 nx)^2} - b\right) \quad (III)$$

also, the directional angle $\theta_2$ of the vector $\rho_2$ is obtained by the following formula $$\theta_2 = \frac{1}{\mu}\int\frac{dx}{\rho_2} \quad (IV)$$

and when the first curved line or the like prepared by the Formulas I and II and the second curved line or the like prepared by the Formulas III and IV are engaged to each other so as to form respective pitch lines, the sum of the vectors of the first and the second curved lines at points on the same arc-length in the same direction measured from the contact point of said two curved lines is kept at a constant, and also the sum of angles at the respective arc sides forming between each of tangential lines and each of the vectors is kept at an angle of 180 degrees; and each tooth of said gear wheels is further modified so as to cut down the crown of the tooth at the short axial part but not to produce any cut out portion on the roots of the tooth at the long axial part, or that the center line passed through the center of each of the teeth-forms at the long axial part is transposed into an outer side of the pitch line and that at the short axial part is transposed into an inner side of the pitch line so as to avoid the interference between the teeth thereby the thickness of the tooth is increased, said two gears formed as above described being arranged and enclosed in a casing so as to cooperate to each other as a driving member.

This driving apparatus may be utilized as a main component in a fluid feeding pump, a vacuum pump, a fluid flowing meter and the like.

In order to facilitate the understanding of this invention, it will now be described with reference to the accompanying drawings which show few embodiments of this invention, in which, Fig. 1 shows a longitudinal sectional view of a pump means according to this invention.

Figure 1:
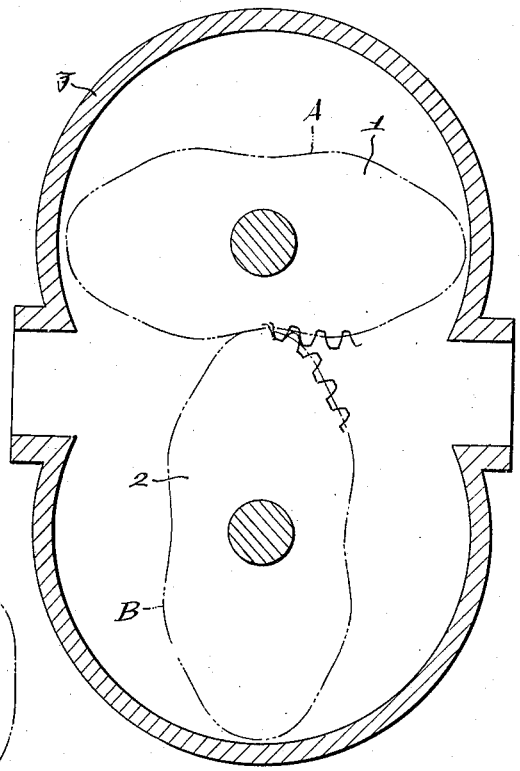
Figure 3:
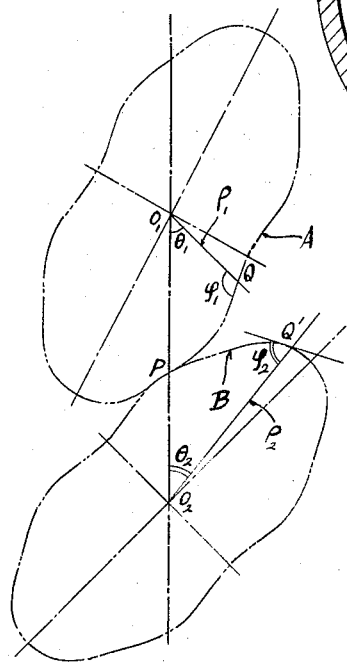
Fig. 3 shows an explanative view of pitch lines showing a gearing state of gear wheels according to this invention.

Now, as shown in the drawings, I have found that in case of a driving apparatus comprising modified elliptic gears wheels is manufactured in the following manner, it can be operated very smoothly without causing sliding between the gear wheels, wherein at the polar coordinates, it is assumed that $x$ indicates an independent variable mentioned in radian, the value of $n$ indicates 2, 3 or 4, $a$, $b$ and $c$ indicate the number regarding the length, $d$ indicates a positive number from zero to 1, and $\mu$ indicates the number determined by $a$, $b$, $c$ and $d$, then the length of a vector $\rho_1$ of a first curved line A is obtained by the following formula $$\rho_1 = a + \cos nx\left(\frac{c.d^2|\sin nx|}{(1-d^2\cos^2 nx)^2} - b\right)$$

also, the direction angle $\theta_1$ of the vector $\rho_1$ is obtained by the following formula $$\theta_1 = \frac{1}{\mu}\int\frac{dx}{\rho_1}$$

the first curved line is prepared by the above two formulas, nextly, the length of a vector $\rho_2$ of a second curved line B is obtained by the following formula $$\rho_2 = a - \cos nx\left(\frac{c.d^2|\sin nx|}{(1-d^2\cos^2 nx)^2} - b\right)$$

also, the directional angle $\theta_2$ of the vector $\rho_2$ is obtained by the following formula $$\theta_2 = \frac{1}{\mu}\int\frac{dx}{\rho_2}$$

the second curved line B is prepared by the above latter two formulas, and when the first curved line A or the like and the second curved line B or the like are engaged so as to form respective pitch lines, then the sum of the vectors $p_1$ and $p_2$ of the first and the second curved lines at points on the same arc-length in the same direction measured from the contact point of said two curved lines is kept at a constant, and also the sum of angles at respective arc-sides forming between each of tangential lines and each of the vectors is kept at an angle of 180 degrees.

Consequently, in accordance with this invention, said two curved lines are used as pitch lines respectively of gear wheels 1 and 2 which are adapted to be rotated smoothly without sliding when geared and are enclosed in a casing 3 so as to cooperate continuously to each other and to form a driving member consisting of modified elliptical gear wheels.

Figure 2:
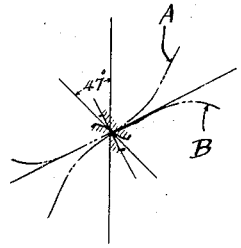
Fig. 2 shows a sectional view of a portion of teeth showing a gearing state of gear wheels according to this invention.
Figures 5, 6:
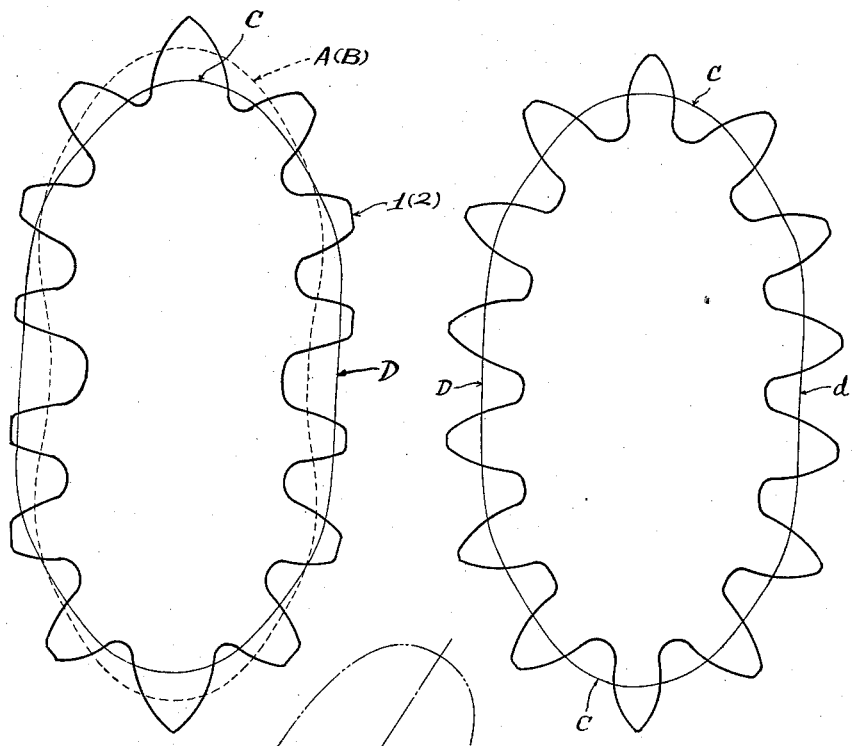
Fig. 5 shows a side elevation of a modified elliptic gear wheel according to an interference preventing method of this invention.
Fig. 6 shows a side elevation of a modified elliptic gear wheel showing a pitch line and a transposed center of teeth forms according to this invention.
Figure 4:
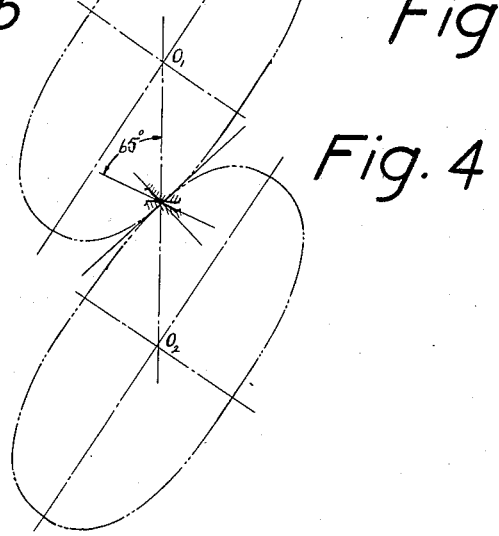
Fig. 4 shows an explanative view of pitch lines showing a gearing state of the old elliptic gear wheels.

Also, according to this invention, as shown in Fig. 2, the minimum value of an angle $\alpha$ formed between the vector and the tangential line at a given point of the curved line is larger than that of the old elliptic gear wheel, and consequently a gearing pressure angle (90°−$\alpha$+tool pressure angle) is decreased so as to reduce the gearing pressure so that the gear wheels are prevented from putting them out of gear and the gearing state of the gear wheels can be kept at a good operating state. Thus, when new teeth are to be provided on the two pitch lines as above described so as to gear to each other, a tooth form of a large module has the interference with a tooth of the mate because a radius of curvature of a pitch line C at the long axial part is small as shown in Fig. 5, and consequently the crown of the tooth at the short axial part should be modified to cut it down so as not to produce any cut out portion on the root of the tooth at the long axial part of the ellipse. Or, as shown in Fig. 6, the center of the tooth-form should be transposed into an outer side of the pitch line C at the long axial part and into an inner side of the pitch line D at the short axial part so as to remove the interference of the tooth at the long axial part and also to strengthen the root of the tooth at that part. By the above means, the number of the teeth to be provided on the pitch line is reduced so that the working of the teeth may be made very easily. Also, when the two gear wheels as above described are arranged and combined properly in the casing, the output of this pump may be not only increased considerably per revolution, but also the gearing state of the gear wheels may be kept in a good operating state.

What I claim is:

1. In a driving pump, the combination of a first gear and a second gear both mounted for rotation about their centers and operatively positioned with their teeth in mesh for all angular positions; each of said gears being of modified elliptical form such that the pitch line in the region of the minor axis is closer to the center than a true ellipse and the pitch line in the region of the major diameter is closer to the center than said ellipse; said first and second gears functioning as impellers to drive fluid through said pump.

2. The combination as set forth in claim 1 wherein the gear teeth in the region of the major axis are wider along the pitch line and taller than the teeth in the region of the minor axis.

3. The combination as set forth in claim 1 in which the sum of vectors drawn from the centers to the point of contact between the pitch lines is constant for all angular positions of said gears.

4. The combination as set forth in claim 3 in which the sum of the angles formed between each of the vectors and lines tangent to the pitch lines associated with the respective vectors is 180° for all angular positions of said gears.

References Cited in the file of this patent

UNITED STATES PATENTS

| | | |
|---|---|---|
| 12,350 | Holly | Feb. 6, 1855 |
| 15,221 | Clow | July 1, 1856 |
| 1,676,202 | Isom | July 3, 1928 |
| 1,837,714 | Jaworowski | Dec. 22, 1931 |
| 2,225,908 | Garthe | Dec. 24, 1940 |
| 2,368,019 | Guibert | Jan. 23, 1945 |
| 2,439,427 | Guibert et al. | Apr. 13, 1948 |
| 2,671,929 | Gayler | Mar. 16, 1954 |

FOREIGN PATENTS

| | | |
|---|---|---|
| 282,752 | Great Britain | May 31, 1928 |
| 286,625 | Switzerland | Feb. 16, 1953 |
| 413,170 | Great Britain | July 12, 1934 |
| 1,049,085 | France | Aug. 12, 1953 |